United States Patent [19]

Kiehlmann et al.

[11] Patent Number: 4,908,180

[45] Date of Patent: Mar. 13, 1990

[54] PRESSURIZED WATER NUCLEAR REACTOR WITH A FUEL ROD CONTAINING A NUCLEAR FUEL COLUMN ENRICHED TO A VARIABLE EXTENT OVER THE LENGTH OF THE ROD

[75] Inventors: Horst-Dieter Kiehlmann, Erlangen; Frank Wunderlich, Bubenreuth, both of Fed. Rep. of Germany

[73] Assignee: Siemens Aktiengesellschaft, Berlin and Munich, Fed. Rep. of Germany

[21] Appl. No.: 120,866

[22] Filed: Nov. 16, 1987

[30] Foreign Application Priority Data

Nov. 18, 1986 [DE] Fed. Rep. of Germany ....... 3639401

[51] Int. Cl.⁴ .......................... G21C 3/28; G21C 3/62
[52] U.S. Cl. .................................. 376/361; 376/428; 376/435
[58] Field of Search ............... 376/435, 428, 901, 172, 376/173, 361, 402

[56] References Cited

U.S. PATENT DOCUMENTS

| | | | |
|---|---|---|---|
| 3,211,627 | 10/1965 | Thorp, II . | |
| 4,096,033 | 6/1978 | Barry | 376/173 |
| 4,251,321 | 2/1981 | Crowther | 376/435 |
| 4,326,922 | 4/1982 | Ferrari et al. | 376/435 |
| 4,483,818 | 11/1984 | Yamashita et al. | 376/435 |
| 4,631,166 | 12/1986 | Camden | 376/435 |
| 4,637,915 | 1/1987 | Camden et al. | 376/435 |

FOREIGN PATENT DOCUMENTS 3308956 of 0000 Fed. Rep. of Germany .
110693 4/1961 Pakistan ............................. 376/428

OTHER PUBLICATIONS

Proceedings of the ANS Topical Meeting, Orlando 1985, vol. 2.

Primary Examiner—Deborah L. Kyle
Assistant Examiner—Richard W. Wendtland
Attorney, Agent, or Firm—Herbert L. Lerner; Laurence A. Greenberg

[57] ABSTRACT

A pressurized water nuclear reactor includes a reactor core, a nuclear reactor fuel assembly disposed in the reactor core, a fuel rod disposed in the fuel assembly, and a nuclear fuel column disposed in the fuel rod being enriched to a variable extent with fissionable nuclei over the length thereof. The reactor core has an inlet for liquid water acting as coolant closest one end of the fuel rod and of the fuel assembly and an outlet for the liquid water closest to the other end of the fuel rod and of the fuel assembly. A steam generator has a primary tube connected to the inlet and the outlet. One half of the nuclear fuel column at the outlet having an average enrichment being less than the average enrichment of the other half of the fuel column, and/or the nuclear fuel column having a depletion zone with an average enrichment being less than the average enrichment over the entire length of the column. The depletion zone has two limits spaced from the end of the column closest to the outlet by distances of substantially 10% and 25% of the total length of the column.

24 Claims, 2 Drawing Sheets

PRESSURIZED WATER NUCLEAR REACTOR WITH A FUEL ROD CONTAINING A NUCLEAR FUEL COLUMN ENRICHED TO A VARIABLE EXTENT OVER THE LENGTH OF THE ROD

The invention relates to a pressurized water nuclear reactor, including a reactor core containing a nuclear fuel column in a fuel rod of a nuclear reactor fuel assembly, especially formed of uranium oxide and/or uranium-plutonium mixed oxide, enriched to a variable extent with fissionable nuclei over the length thereof, the reactor core having an inlet for liquid water acting as coolant at one end of the fuel rod and therefore of the fuel assembly and an outlet for the liquid water at the other end, both of which lead to a primary tube of a steam generator.

A nuclear reactor fuel assembly for this kind of pressurized reactor is known from the Proceedings of the ANS Topical Meeting, Orlando 1985, Vol. 2, pp. 7–13 through 7–28. The ends of the nuclear fuel column in one fuel rod of this prior art nuclear reactor fuel assembly are formed of $UO_2$ having a natural concentration of $U^{235}$ nuclei. Between these two ends, the fuel column is formed of enriched $UO_2$, in which the concentration of $U^{235}$ nuclei capable of fission with thermal neutrons is higher than the natural concentration. The ends of the fuel column that are formed of $UO_2$ at a natural concentration are intended to improve the neutron economy in the reactor core of the pressurized water reactor.

The nuclear fuel column is located in a fuel rod cladding tube which is formed of metal, as a rule a zirconium alloy. During operation in the pressurized water reactor, corrosion layers of oxide form on the surface of the cladding tube facing toward the water. The thickness of these layers depends on the cladding tube temperature and can limit the allowable in-core residence time of the fuel rod and thus of the nuclear reactor fuel assembly in the nuclear reactor. Since the temperature profile is asymmetrical over the length of the fuel rod in the liquid water of the pressurized water reactor, the thickness of the corrosion layer is also asymmetrical over the length of the fuel rod. In other words, the thickness is at a pronounced maximum near the end of the fuel rod located at the reactor core outlet for the liquid water. If the corrosion layer is a dominant factor for the in-core residence time of the fuel rod and therefore of the nuclear reactor fuel assemblies in the pressurized water reactor, this maximum thickness of the corrosion layer is the quantitative scale for the allowable in-core residence time.

It is accordingly an object of the invention to provide a pressurized water nuclear reactor, which overcomes the hereinafore-mentioned disadvantages of the heretofore-known devices of this general type and which prolongs the allowable in core residence time of the fuel rod and therefore of the nuclear reactor fuel assembly in the pressurized water reactor.

With the foregoing and other objects in view there is provided, in accordance with the invention, a pressurized water nuclear reactor, comprising a reactor core, a nuclear reactor fuel assembly disposed in the reactor core, a fuel rod disposed in the fuel assembly, a nuclear fuel column disposed in the fuel rod being enriched to a variable extent with fissionable nuclei over the length thereof, the nuclear fuel column being preferably formed of a material from the group consisting of uranium oxide and uranium-plutonium mixed oxide, the reactor core having an inlet for liquid water acting as coolant closest one end of the fuel rod and of the fuel assembly and an outlet for the liquid water closest to the other end of the fuel rod and of the fuel assembly, a steam generator having a primary tube connected to the inlet and the outlet, one half of the nuclear fuel column at the outlet having an average enrichment being less than the average enrichment of the other half of the fuel column, and/or the nuclear fuel column having a depletion zone with an average enrichment being less than the average enrichment over the entire length of the column, the depletion zone having two limits spaced from the end of the column closest to the outlet by distances of substantially 10% and 25% of the total length of the column. The average enrichments are all arithmetical mean values.

As a result, the heating surface load over the length of the surface on the water side of the cladding tube, in watts per $cm^2$, is modified in such a way that the thickness of the corrosion layer forming on the water side of the cladding tube of the fuel rod is evened out and the allowable in-core residence time for the fuel rod in the pressurized water reactor is prolonged.

In accordance with another feature of the invention, the enrichment decreases in stages from the end of the column closest to the inlet toward the other end of the column.

In accordance with a further feature of the invention, the enrichment increases at both of the ends of the column.

In accordance with an added feature of the invention, both of the ends of the column are formed of a material from the group consisting of natural uranium and depleted uranium having a lesser concentration of $U^{235}$ nuclei than natural uranium.

In accordance with an additional feature of the invention, one half of the nuclear fuel column closest to the outlet has an average enrichment substantially between 1% and 30% and preferably substantially between 3% and 15% less than the enrichment averaged over the total length of the column.

In accordance with a concomitant feature of the invention, the depletion zone has an average enrichment substantially between 5% and 50% and preferably substantially between 10% and 30% less than the enrichment averaged over the total length of the column.

Through the use of the features mentioned above, the thickness of the corrosion layer on the water side of the fuel rod cladding tube can be evened out even further, and the allowable in-core residence time of the fuel rod and therefore of the nuclear reactor fuel assembly in the pressurized water reactor can be increased even further.

It is true that U.S. Pat. No. 4,483,818 discloses fuel rods having nuclear fuel columns that have a higher average enrichment at the coolant inlet of a reactor core than at the coolant outlet. However, this patent relates to a boiling water reactor, in which the coolant at the coolant outlet is steam that is carried directly to a turbine, and the object of this distribution of the enrichment in a boiling water reactor is to attain an axial evening out of the power of the fuel rods, while in a boiling water reactor no particular thickening of the corrosion layer on the coolant outlet end of the fuel rod cladding tubes takes place.

Other features which are considered as characteristic for the invention are set forth in the appended claims.

Although the invention is illustrated and described herein as embodied in a pressurized water nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
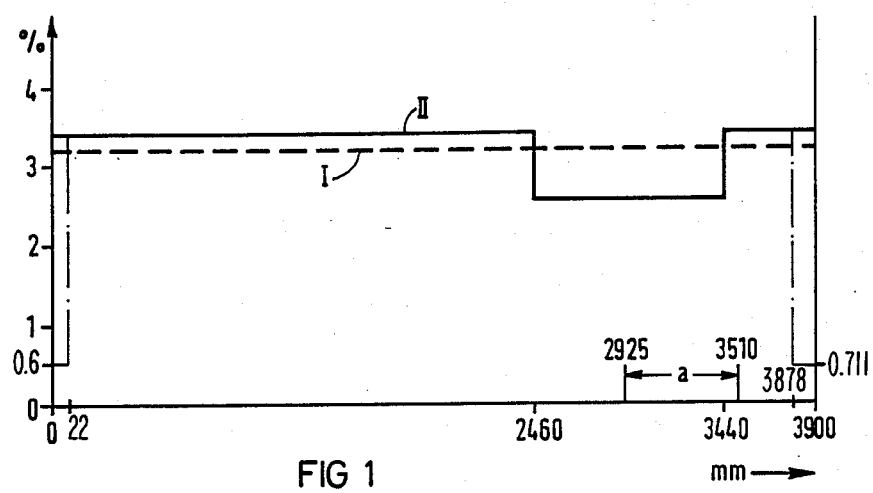
FIG. 1 is a graph of the factory enrichment of fuel columns in percent for two fuel rods on the ordinate, plotted against the length of the particular fuel column on the abscissa.

Referring now to the figures of the drawings in detail and first, particularly, to FIG. 1 thereof, there are seen two fuel rods, both having a fuel column length of 3900 mm. The fuel columns are formed of pellets of $UO_2$ laid next to each other, all of which have a height of 11 mm and a diameter of 9.11 mm. The cladding tubes of the two fuel rods are identical and are formed of an alloy of zirconium, tin, iron and chromium. The cladding tubes have an outside diameter of 10.75 mm and a wall thickness of 0.72 mm.

In one fuel rod represented by the straight broken line I in FIG. 1 and serving as a comparison fuel rod, the nuclear fuel column has an overall factory enrichment of 3.2% of $U^{235}$ over the length thereof.

After an in-core residence time of three years in the pressurized water reactor, a corrosion layer has formed on the water side of the cladding tube of the comparison fuel rod. The profile of the thickness of the corrosion layer over the length of the fuel rod is represented by the curve I drawn in broken lines in FIG. 2. By comparison, in the second fuel rod, which is constructed in accordance with the invention, the distribution of the factory enrichment in the fuel column is represented by the curve II drawn in solid lines in FIG. 1. The enrichment with $U^{235}$ amounts to 2.6% in the zone from 2460 mm to 3440 mm measured from the end of the nuclear fuel column at the reactor core inlet for the liquid water, which is at 0 mm. Outside this zone, the nuclear fuel column has an overall $U^{235}$ enrichment of 3.4%. Thus a depletion zone "a" is formed which has an enrichment averaged over the depletion zone "a" that is less than the enrichment averaged over the entire column length of 3900 mm. The limits of the depletion zone "a" are located at 2925 mm and 3510 mm from the end of the nuclear fuel column at the reactor core inlet for the liquid water at 0 mm.

The dot-dash line in FIG. 1 indicates a change in the distribution of the factory enrichment represented by the solid line curve II in order to improve the neutron economy in the reactor core of the pressurized water nuclear reactor. Two pellets or tablets disposed at respective ends of the fuel column in this case, are not formed of $UO_2$ uranium enriched with $U^{235}$, but instead with natural uranium (0.711% $U^{235}$) at the reactor core outlet for the liquid water and with the depleted uranium (0.6% $U^{235}$) at the reactor core inlet for the liquid water.

Figure 2:
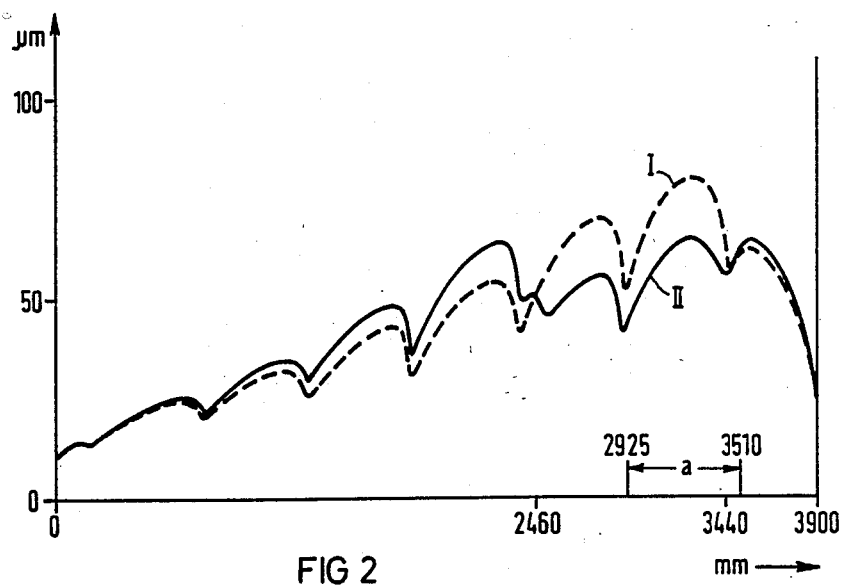
FIG. 2 is a graph of the thickness of the corrosion layer on the water side of the cladding tubes of the fuel rods in um at the end of the service life thereof in a pressurized water nuclear reactor on the ordinate, plotted against the length of the fuel column on the abscissa.

In FIG. 2, the solid curve II shows the profile of the thickness of the corrosion layer on the outside of the cladding tube of the second fuel rod, once again after an in core residence time of three years in the pressurized water reactor.

It is apparent that the thickness of the corrosion layer in the maximum range thereof according to curve II is considerably less than in the maximum range according to curve I. This means that an increased allowable in core residence time in the pressurized water reactor is provided for the second fuel rod, which is constructed in accordance with the invention.

The minima of the curves I and II in FIG. 2 are the result of spacers, which are part of the nuclear reactor fuel assembly in the pressurized water reactor.

Figure 3:
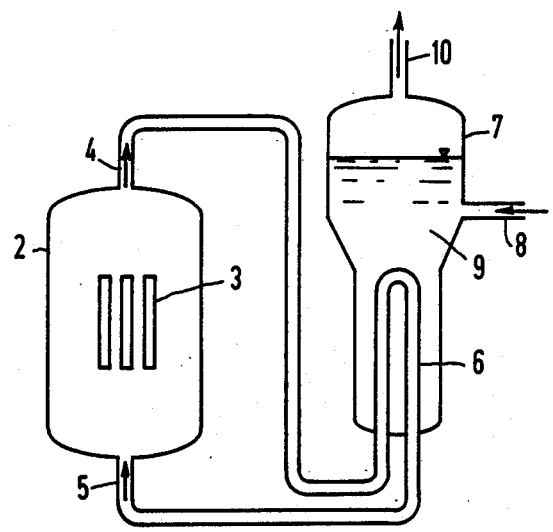
FIG. 3 is a diagrammatic elevational view of a pressurized water nuclear reactor according to the invention.

According to FIG. 3, a pressurized water reactor has a pressure vessel 2, containing a reactor core including nuclear reactor fuel assemblies 3 having fuel rods as described above and having a nuclear fuel column, such as one described by the solid line II in FIG. 1.

An outlet 4 of the pressure vessel 2 for liquid water and therefore the outlet of the reactor core having the fuel assemblies 3, is connected to one end of a primary tube 6 of a steam generator 7. An inlet 5 of the pressure vessel 2 for liquid water and therefore the inlet of the reactor core as well, is connected to the other end of the primary tube 6. A primary loop formed of the pressure vessel 2 and the primary tube 6 is sealed, so that no water vapor can form in the primary loop and therefore in the reactor core. Water vapor forms on the secondary side of the steam generator 7, which has a supply connector 8 for feedwater 9 and an outlet connector 10 for steam. The steam is carried from the outlet connector 10 to a non-illustrated steam turbine, for instance.

We claim:

1. Pressurized water nuclear reactor, comprising a reactor core, a nuclear reactor fuel assembly disposed in said reactor core, a fuel rod disposed in said fuel assembly, a nuclear fuel column disposed in said fuel rod being enriched to a variable extent with fissionable nuclei over the length thereof, said reactor core having an inlet for liquid water acting as coolant closest one end of said fuel rod and of said fuel assembly and an outlet for the liquid water closest to the other end of said fuel rod and of the fuel assembly, a steam generator having a primary tube connected to said inlet and said outlet, one half of said nuclear fuel column at said outlet having an average enrichment being less than the average enrichment of the other half of said fuel column, and said nuclear fuel column having a depletion zone with an average enrichment being less than the average enrichment over the entire length of said column, said depletion zone having two limits spaced from the end of said column closest to said outlet by distances of substantially 10% and 25% of the total length of said column.

2. Pressurized water reactor according to claim 1, wherein said nuclear fuel column is formed of a material from the group consisting of uranium oxide and uranium-plutonium mixed oxide.

3. Pressurized water reactor according to claim 1, wherein said enrichment decreases in stages from the end of said column closest to said inlet toward the other end of said column.

4. Pressurized water reactor according to claim 3, wherein said enrichment increases at both of the ends of said column.

5. Pressurized water reactor according to claim 1, wherein both of the ends of said column are formed of a material from the group consisting of natural uranium and depleted uranium having a lesser concentration of $U^{235}$ nuclei than natural uranium.

6. Pressurized water reactor according to claim 1, wherein one half of said nuclear fuel column closest to said outlet has an average enrichment substantially between 1% and 30% less than said enrichment averaged over the total length of said column.

7. Pressurized water reactor according to claim 1, wherein one half of said nuclear fuel column closest to said outlet has an average enrichment substantially between 3% and 15% less than said enrichment averaged over the total length of said column.

8. Pressurized water reactor according to claim 1, wherein said depletion zone has an average enrichment substantially between 5% and 50% less than said enrichment averaged over the total length of said column.

9. Pressurized water reactor according to claim 1, wherein said depletion zone has an average enrichment substantially between 10% and 30% less than said enrichment averaged over the total length of said column.

10. Pressurized water nuclear reactor, comprising a reactor core, a nuclear reactor fuel assembly disposed in said reactor core, a fuel rod disposed in said fuel assembly, a nuclear fuel column disposed in said fuel rod being enriched to a variable extent with fissionable nuclei over the length thereof, said reactor core having an inlet for liquid water acting as coolant closest one end of said fuel rod and of said fuel assembly and an outlet for the liquid water closest to the other end of said fuel rod and of the fuel assembly, and a steam generator having a primary tube connected to said inlet and said outlet, one half of said nuclear fuel column at said outlet having an average enrichment being less than the average enrichment of the other half of said fuel column, said enrichment decreasing in stages from the end of said column closest to said inlet toward the other end of said column.

11. Pressurized water reactor according to claim 10, wherein said nuclear fuel column is formed of a material from the group consisting of uranium oxide and uranium-plutonium mixed oxide.

12. Pressurized water reactor according to claim 10, wherein said enrichment increases at both of the ends of said column.

13. Pressurized water reactor according to claim 10, wherein both of the ends of said column are formed of a material from the group consisting of natural uranium and depleted uranium having a lesser concentration of $U^{235}$ nuclei than natural uranium.

14. Pressurized water reactor according to claim 10, wherein one half of said nuclear fuel column closest to said outlet has an average enrichment substantially between 1% and 30% less than said enrichment averaged over the total length of said column.

15. Pressurized water reactor according to claim 10, wherein one half of said nuclear fuel column closest to said outlet has an average enrichment substantially between 3% and 15% less than said enrichment averaged over the total length of said column.

16. Pressurized water nuclear reactor, comprising a reactor core, a nuclear reactor fuel assembly disposed in said reactor core, a fuel rod with a metal cladding tube disposed in said fuel assembly, a nuclear fuel column disposed in said fuel rod being enriched to a variable extent with fissionable nuclei over the length thereof, said reactor core having an inlet for liquid water acting as coolant closest one end of said fuel rod and of said fuel assembly and an outlet for the liquid water closest to the other end of said fuel rod and of the fuel assembly, a steam generator having a primary tube connected to said inlet and said outlet, said nuclear fuel column having a depletion zone with an average enrichment being less than the average enrichment over the entire length of said column, said depletion zone having two limits spaced from the end of said column closest to said outlet by distances of substantially 10% and 25% of the total length of said column.

17. Pressurized water reactor according to claim 16, wherein said nuclear fuel column is formed of a material from the group consisting of uranium oxide and uranium-plutonium mixed oxide.

18. Pressurized water reactor according to claim 16, wherein said enrichment decreases in stages from the end of said column closest to said inlet toward the other end of said column.

19. Pressurized water reactor according to claim 18, wherein said enrichment increases at both of the ends of said column.

20. Pressurized water reactor according to claim 16, wherein both of the ends of said column are formed of a material from the group consisting of natural uranium and depleted uranium having a lesser concentration of $U^{235}$ nuclei than natural uranium.

21. Pressurized water reactor according to claim 16, wherein one half of said nuclear fuel column closest to said outlet has an average enrichment substantially between 1% and 30% less than said enrichment averaged over the total length of said column.

22. Pressurized water reactor according to claim 16, wherein one half of said nuclear fuel column closest to said outlet has an average enrichment substantially between 3% and 15% less than said enrichment averaged over the total length of said column.

23. Pressurized water reactor according to claim 16, wherein said depletion zone has an average enrichment substantially between 5% and 50% less than said enrichment averaged over the total length of said column.

24. Pressurized water reactor according to claim 16, wherein said depletion zone has an average enrichment substantially between 10% and 30% less than said enrichment averaged over the total length of said column.

* * * * *